(12) United States Patent
Zhuang et al.

(10) Patent No.: US 8,319,579 B2
(45) Date of Patent: Nov. 27, 2012

(54) PASSIVE FILTER AND AC COUPLER RECEIVER INTERFACE

(75) Inventors: Jingcheng Zhuang, Allen, TX (US);
Bruce A. Doyle, Longmont, CA (US);
Emerson S. Fang, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 69 days.

(21) Appl. No.: 12/955,040

(22) Filed: Nov. 29, 2010

(65) Prior Publication Data

US 2012/0133459 A1 May 31, 2012

(51) Int. Cl.
*H04B 3/04* (2006.01)
(52) U.S. Cl. ........................ 333/28 R; 333/18
(58) Field of Classification Search ............... 333/18, 333/28 R; 375/229, 230, 231
See application file for complete search history.

(56) References Cited

PUBLICATIONS

Fang, Emerson, et al., "A 5.2Gbps HyperTransport™ Integrated AC Coupled Receiver with DFR DC Restore," 2007 Symposium on VLSI Circuits Digest of Technical Papers, Jun. 14-16, 2007, pp. 34 and 35.

*Primary Examiner* — Stephen Jones
(74) *Attorney, Agent, or Firm* — Zagorin O'Brien Graham LLP

(57) ABSTRACT

An apparatus includes a capacitor coupled between a first node responsive to receive an input signal and a second node. The apparatus includes a first circuit coupled to the second node and a third node. The first circuit is selectively operable to separately configure at least one of a low-frequency gain of an equalizer and a pole of the equalizer. The equalizer includes the first circuit and the capacitor. The second node is responsive to receive an equalized version of an AC signal of the input signal in a first mode of the apparatus. The second node is responsive to receive a non-equalized version of the AC signal of the input signal in a second mode of the apparatus. The equalized version of the AC signal of the input signal may be a level-shifted and equalized version of the AC signal in the first mode of the apparatus.

24 Claims, 6 Drawing Sheets

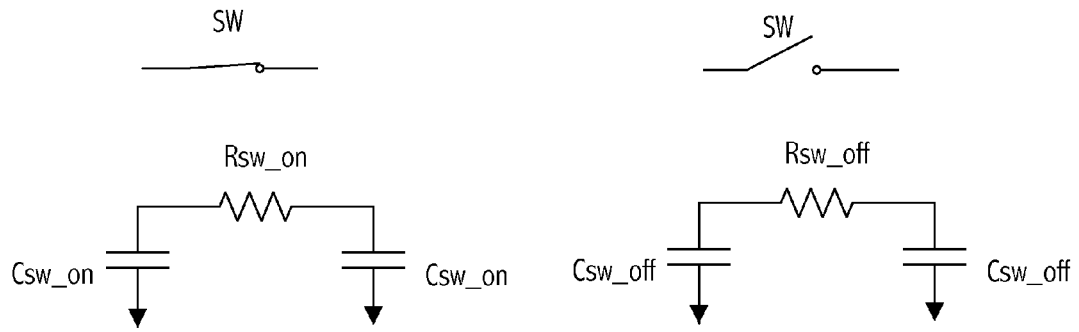
FIG. 3a
FIG. 3b
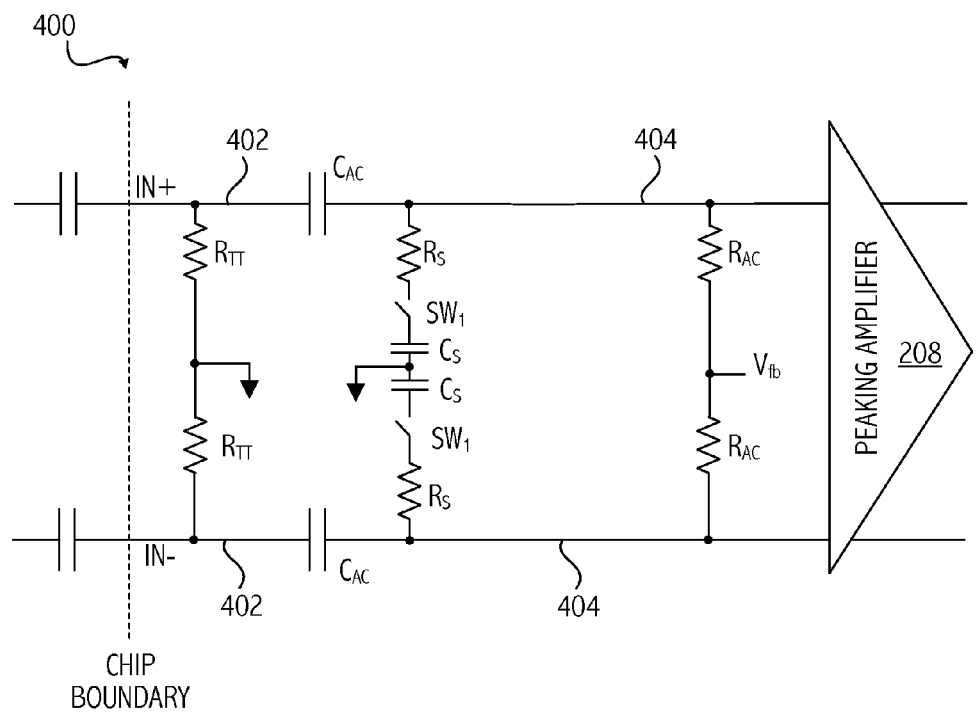
FIG. 4

PASSIVE FILTER AND AC COUPLER RECEIVER INTERFACE

BACKGROUND

1. Field of the Invention

This application is related to integrated circuits and more particularly to communications interfaces of integrated circuits.

2. Description of the Related Art

In general, a receiver interface of a communications system uses AC coupling techniques to reduce effects of low-frequency disturbances, e.g., undesirable DC offsets. In addition, AC coupling reduces the need for a common ground reference between integrated circuits on separate printed circuit boards. A conventional receiver interface for AC-coupled communications includes an equalizer to equalize channel loss by attenuating low-frequency energy while maintaining high-frequency energy. High linearity of the equalizer is desired due to a wide-swing of the signals received by the receiver interface. Thus, a conventional receiver interface attenuates low frequencies using a voltage divider circuit, more specifically, a resistor-based network.

The resistor-based network is a DC-coupled circuit that requires an additional AC coupler in many applications (e.g., PCI Express or other AC coupled interface). In addition, the resistor-based network introduces a large parasitic capacitance into the signal path that narrows the overall bandwidth of the receiver. Another drawback of the resistor-based network is the requirement of tuning multiple resistors simultaneously in order to configure low-frequency attenuation or location of a pole of the signal response.

SUMMARY OF EMBODIMENTS OF THE INVENTION

In at least one embodiment of the invention, an apparatus includes a capacitor coupled between a first node responsive to receive an input signal and a second node. The apparatus includes a first circuit coupled to the second node and a third node. The first circuit is selectively operable to configure at least one of a low-frequency gain of an equalizer and a pole of the equalizer. The equalizer includes the first circuit and the capacitor. The second node is responsive to receive an equalized version of an AC signal of the input signal in a first mode of the apparatus. The second node is responsive to receive a non-equalized version of the AC signal of the input signal in a second mode of the apparatus. In at least one embodiment of the invention, the first circuit is selectively operable to separately configure the low-frequency gain of the equalizer and the pole of the equalizer. In at least one embodiment of the invention, the apparatus includes a second circuit coupled to the second node and a fourth node, the fourth node being responsive to receive a bias voltage. The equalized version of the AC signal of the input signal may be a level-shifted and equalized version of the AC signal of the input signal in the first mode of the apparatus. The non-equalized version of the AC signal of the input signal may be a level-shifted version of the AC signal of the input signal in the second mode of the apparatus.

In at least one embodiment of the invention, a method includes receiving a received signal on a first node of a receiver interface. The method includes capacitively coupling the first node to a second node of the receiver interface. The second node receives an equalized version of an AC portion of the received signal in a first mode of the receiver interface. The second node receives a non-equalized version of the AC portion of the received signal in a second mode of the receiver interface. In at least one embodiment of the invention, in the first mode of the receiver interface, the method further comprises passively equalizing the received signal. The passively equalizing includes the capacitively coupling.

In at least one embodiment of the invention, a tangible computer-readable medium encodes a representation of an integrated circuit that includes a capacitor coupled between a first node responsive to receive an input signal and a second node. The integrated circuit includes a first circuit coupled to the second node and a third node. The second circuit is selectively operable to configure at least one of a low-frequency gain of an equalizer and a pole of the equalizer. The equalizer includes the second circuit and the capacitor. The second node is responsive to receive an equalized version of an AC signal of the input signal in a first mode of the integrated circuit. The second node is responsive to receive a non-equalized version of the AC signal of the input signal in a second mode of the integrated circuit. In at least one embodiment of the invention, the first circuit is selectively operable to separately configure the low-frequency gain of the equalizer and the pole of the equalizer. In at least one embodiment, the integrated circuit includes a second circuit coupled to the second node and a fourth node, the fourth node being responsive to receive a bias voltage. In at least one embodiment of the integrated circuit, the equalized version of the AC signal of the input signal is a level-shifted and equalized version of the AC signal of the input signal in the first mode of the integrated circuit. In at least one embodiment of the integrated circuit, the non-equalized version of the AC signal of the input signal is a level-shifted version of the AC signal of the input signal in the second mode of the integrated circuit

BRIEF DESCRIPTION OF THE DRAWINGS

The present invention may be better understood, and its numerous objects, features, and advantages made apparent to those skilled in the art by referencing the accompanying drawings.

FIGS. 3a and 3b illustrate exemplary circuit representations of switch circuits in a closed state and in an open state, respectively.

FIG. 4 illustrates a functional block diagram of an exemplary receiver interface including a passive filter and AC coupler circuit consistent with at least one embodiment of the invention.

DETAILED DESCRIPTION

Figure 1:
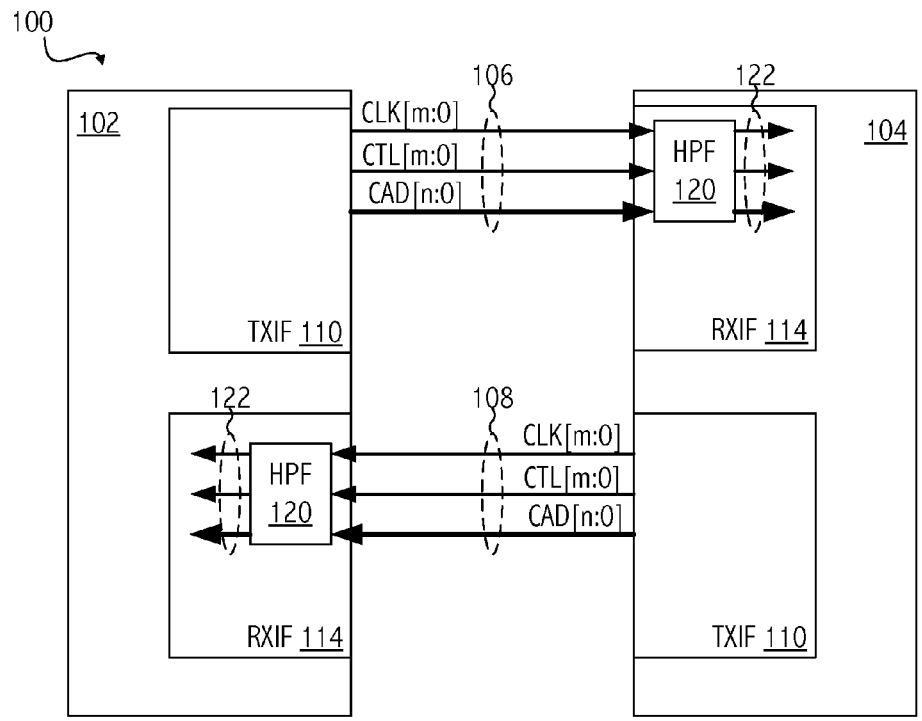
FIG. 1 illustrates a block diagram of two integrated circuit devices coupled by a communications link.

Referring to FIG. 1, exemplary integrated circuit communications interfaces (e.g., transmit interfaces 110 and receiver interfaces 114 of integrated circuits 102 and 104) may incorporate AC coupling techniques to reduce effects of low-frequency disturbances, e.g., undesirable DC offsets, and to reduce the need for a common ground reference for the integrated circuits. As referred to herein, AC coupling is the coupling of one circuit to another circuit through a capacitor or other device that passes the varying portion (i.e., AC), but not the static (i.e., DC) characteristics of an electrical signal. For example, in at least one embodiment of system 100, signals transmitted on communications lines 106 and 108 are high-pass filtered (e.g., by high-pass filters 120) in receiver interfaces 114 to generate a substantially varying signal or high-frequency signal (e.g., AC signal 122). Those signals may be level-shifted to include a particular DC component. Note that receiver interfaces 114 may include pads, electrostatic discharge (i.e., ESD) circuitry and/or termination circuits or other circuits (not shown), which may be coupled between communications lines 106 and 108 and corresponding high-pass filters 120.

Figure 2:
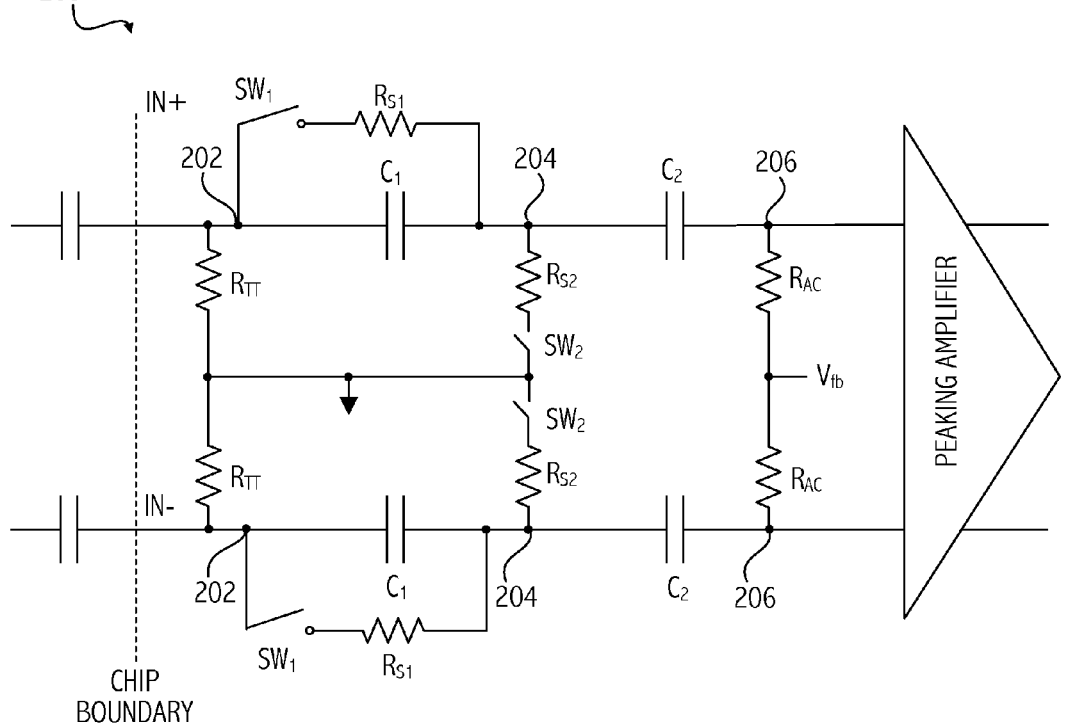
FIG. 2 illustrates a circuit diagram of an exemplary receiver interface.

Referring to FIG. 2, an exemplary receiver interface (e.g., circuit 200) is a differential circuit responsive to receive a differential signal and includes two symmetric circuit portions (e.g., a first portion of the differential circuit coupled to receive a first component of the differential signal and a second portion of the differential circuit coupled to receive a second component of the differential signal). Discussions of circuit 200 and other symmetric receiver circuits responsive to differential receive signals described herein referring to only one portion of the symmetric circuit apply to the other, symmetric portion of the receiver circuit, unless stated otherwise. In at least one embodiment, circuit 200 processes a received analog signal to make it suitable for subsequent circuitry (e.g., high-speed sampling circuits). In at least one embodiment, circuit 200 terminates the input common mode voltage to ground via resistors $R_{TT}$, which have resistances that reduce signal reflections. As referred to herein, a passive circuit is a circuit including no source of energy, i.e., a circuit including only elements that have no gain or control, e.g., resistor, inductor, capacitor. An exemplary equalization circuit (e.g., high-pass filter circuit) is formed by a passive circuit including resistor $R_{S1}$, capacitor $C_1$, resistor $R_{S2}$ and switches $SW_1$ and $SW_2$.

Still referring to FIG. 2, a signal is received on node 202 and an equalized version of the received signal is received by node 204. At high frequencies, capacitor $C_1$ behaves like a short circuit and at low frequencies, capacitor $C_1$ behaves like an open circuit. At low frequencies, resistors $R_{S1}$ and $R_{S2}$ behave like a voltage divider. For example, assuming $R_{S1}=R_{S2}$, at low frequencies, the voltage on node 204 is approximately one-half the voltage on node 202. At high frequencies, the voltage on node 204 is approximately equal to the voltage on node 202. Although FIG. 2 illustrates only single devices (e.g., one resistor $R_{S1}$, one switch $SW_1$, one resistor $R_{S2}$, and one switch $SW_2$), embodiments of a receiver interface may include multiple devices or multiple branches of devices coupled in parallel (e.g., multiple branches of resistor $R_{S1}$ and switch $SW_1$ coupled in parallel and/or multiple branches of resistor $R_{S2}$ and switch $SW_2$ coupled in parallel). The equalizer may be tuned by selectively enabling different branches of resistors according to control signals corresponding to each of multiple switches $SW_1$ and each of multiple switches $SW_2$. However, to prevent changing a pole of the equalizer filter (i.e., to keep a pole of the equalizer substantially constant), both resistors $R_{S1}$ and $R_{S2}$ must be changed. Each of the switches (e.g., each of the $SW_1$ switches and each of the $SW_2$ switches) used to make the equalizer tunable may be modeled as illustrated in FIGS. 3a and 3b. When an individual switch is closed, the switch introduces resistance ($R_{SW\_ON}$) and parasitic capacitances ($C_{SW\_ON}$). Referring back to FIG. 2, the parasitic capacitances of the switches reduce the voltage swing of the signal on node 204 and the bandwidth of the receiver interface.

Still referring to FIG. 2, circuit 200 includes an AC coupler in series with the equalizer circuit. The AC coupler includes capacitor $C_2$ (e.g., approximately 2 pF), which is in series with capacitor $C_1$ (e.g., approximately 0.5 pF) of the equalizer circuit. Capacitor $C_2$ introduces associated parasitic capacitances on each terminal of $C_2$. Those parasitic capacitances attenuate high frequencies of the signal at node 204 due to a capacitance division between capacitor $C_1$ and the capacitance $C_{2pp}+(C_{2pn}C_2)/(C_{2pn}+C_2)$. Even ignoring the parasitic capacitances associated with capacitor $C_2$, since $C_2$ is not infinite and the impedance is not zero, $C_2$ increases the source impedance at node 206, which results in high-frequency signal loss. For example, those series-coupled capacitors form a voltage divider, which attenuates the signal with a gain of $C_1/(C_1+C_2)$. In at least one embodiment of circuit 200, one or more additional switches are coupled to one or more resistors $R_{S2}$ and introduce even more parasitic capacitance, which further reduces the bandwidth of the receiver interface.

In at least one embodiment, circuit 200 has a first-order transfer function, i.e., a transfer function including one zero, one pole, a 20 dB/decade slope between the zero and the pole, and a slope of zero elsewhere. As referred to herein, "high frequency" refers to a frequency greater than the pole frequency, "low frequency" refers to a frequency lower than the zero frequency, "low-frequency gain" refers to the gain at low frequencies, and "high-frequency gain" refers to the gain at high frequencies. Receiver interfaces described herein include a peaking amplifier, which provides a different gain of low-frequency signals and high-frequency signals as compared to the equalizer gain. However, in other embodiments of a receiver interface consistent with the teachings herein, the passive filter and AC coupler are coupled to other circuits having different functions.

Referring to FIG. 4, an exemplary receiver interface (e.g., circuit 400) includes a passive filter and AC coupler circuit that provides similar functionality to circuit 200 of FIG. 2. However, circuit 400 includes a single capacitor (capacitor $C_{AC}$) in the signal path that is used to implement the equalization function and the AC coupling function. Circuit 400 does not include any switches in parallel with capacitor $C_{AC}$, thereby improving the bandwidth of circuit 400 as compared to circuit 200. Circuit 400 operates in two modes: a first mode that applies AC coupling and equalization functions to the received signal and a second mode that only applies the AC coupling to the received signal. In both modes, the signal received on node 402 is capacitively coupled to node 404.

For example, the first mode, which includes the passive equalization filtering function, is enabled by closing switch $S_{W1}$. Ignoring $R_{AC}$, which creates a low-frequency AC-coupling pole, the transfer function of the passive filter circuit is:

$$H_{eq}(S) = \frac{s + \frac{1}{R_S C_S}}{s + \frac{C_S + C_{AC}}{C_S C_{AC} R_S}}.$$

The passive filter has one zero, one pole, and unity gain at high frequencies. The low-frequency gain of the passive filter is approximately $$K_{LF} = \frac{C_{AC}}{C_{AC} + C_S}.$$

Thus, the gain at low frequencies can be tuned by tuning $C_S$. For example, if the capacitance of $C_S$ equals the capacitance of $C_{AC}$, the low-frequency attenuation is 6 dB. If the capacitance of $C_S$ is three times the capacitance of $C_{AC}$, the low-frequency attenuation is 12 dB. Ignoring resistor $R_{AC}$, which in at least one embodiment of circuit 400 is much larger than $R_S$ and used to set the DC voltage of the AC-coupler output, the pole frequency ($f_{pole}$, in Hertz (Hz)) is approximately $$f_{pole} = \frac{1 + \frac{C_{AC}}{C_S}}{2\pi C_{AC} R_{AC}}.$$

Accordingly, the pole frequency can be adjusted by tuning the resistance of $R_S$. In at least one embodiment of the passive filter, $C_S$ is much larger than $C_{AC}$ (i.e., $C_S \gg C_{AC}$) and the pole frequency is a weak function of $C_S$. Therefore, the low-frequency gain and the pole location of the equalizer can be tuned separately by independently tuning $C_S$ and $R_S$, respectively. The zero frequency of the passive filter (in Hz) is approximately $$f_{zero} = \frac{1}{2\pi C_S R_s}$$

In at least one embodiment of circuit 400, the resistor $R_{AC}$ introduces an additional zero at the DC voltage and an additional pole at the AC-coupling corner frequency of the passive filter (fC, in Hz), which is approximately $$f_C = \frac{1}{2\pi (C_S + C_{AC}) R_{AC}}.$$

In the second mode, switch $SW_1$ is open and the passive equalization filtering function is disabled.

Figure 5:
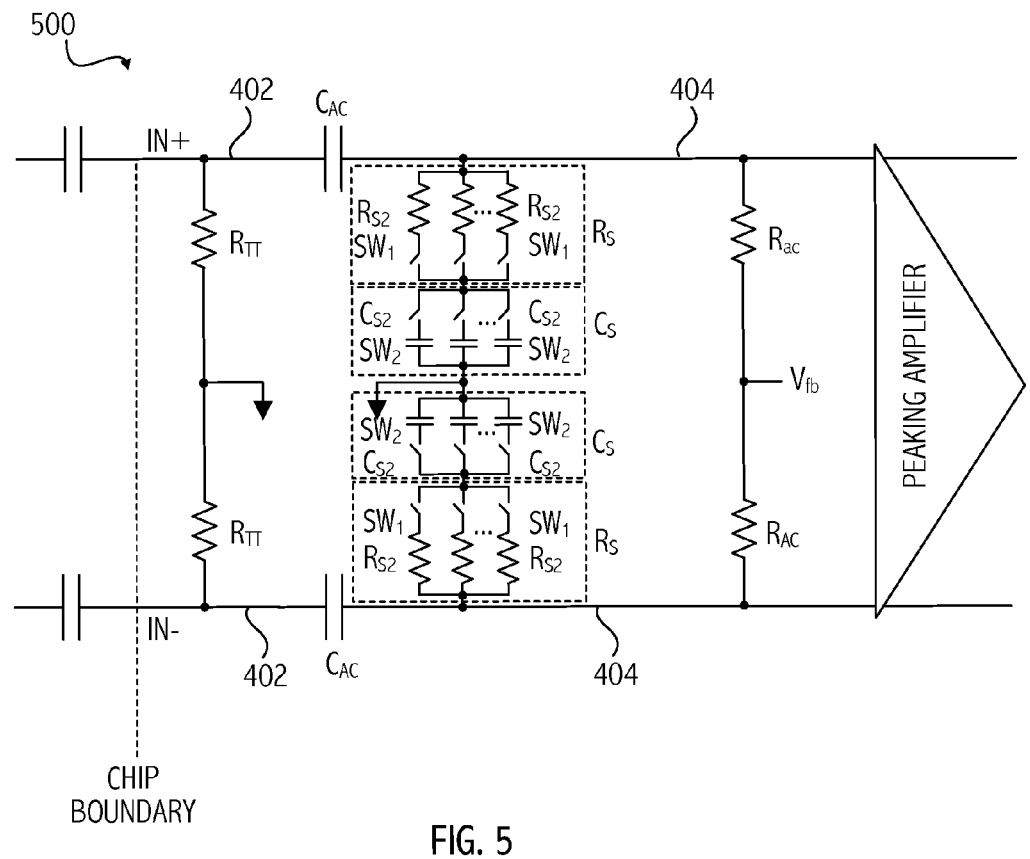
FIG. 5 illustrates a functional block diagram of an exemplary receiver interface including a passive filter and AC coupler circuit having a selectable gain and a selectable pole consistent with at least one embodiment of the invention.

Referring to FIG. 5, in at least one embodiment of an exemplary receiver interface (e.g., circuit 500), multiple branches (e.g., 16 branches), each including a resistor Rs2 and a switch $SW_1$, are coupled in parallel. The passive filter is enabled by closing at least one switch $SW_1$ and at least one switch $SW_2$. A location of a pole of the passive filter is determined by using one or more control signals to selectively enable a particular combination of resistors $R_{S2}$ by closing corresponding switches $SW_1$. A low-frequency gain of the passive filter is determined by using one or more control signals to selectively enable a particular combination of capacitors $C_{S2}$ by closing corresponding switches $SW_2$. Circuit 500 allows independent tuning of the low-frequency gain and the pole location. The location of the pole in the transfer function for circuit 500 may be tuned by selectively enabling different ones of the resistors $R_{S2}$. In addition, the low-frequency gain may be separately varied by changing the capacitance by selectively enabling different ones of the capacitors $C_{S2}$. In at least one embodiment of a receiver interface, thermometer coding is used for tuning capacitance $C_S$ to improve differential linearity of circuit 500. In embodiments of a passive filter consistent with circuit 400 or circuit 500, no switches are directly connected to the signal path to reduce the signal gain. In addition, in embodiments of circuit 400 and circuit 500, the bandwidth and gain are not reduced by any capacitors that are coupled in series with capacitor $C_{AC}$. Since both circuits 400 and 500 are always AC coupled whether or not the passive filter is enabled, there is no need to charge external capacitance to maintain a consistent DC voltage. Instead, the output DC voltage on node 404 is set by a reference voltage $V_{FB}$, which is chosen based on an input common mode voltage of subsequent circuitry and is generated by any suitable technique.

Figure 6:
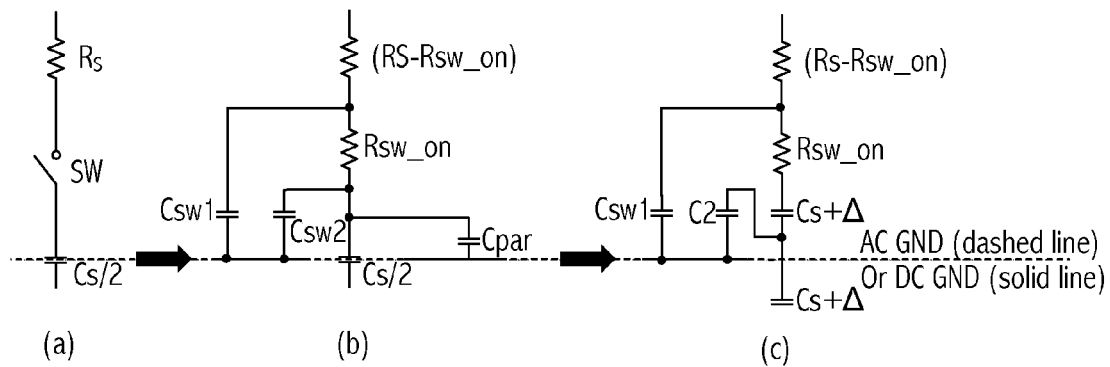
FIG. 6 illustrates an exemplary resistor-switch circuit and equivalent circuits.

Referring to FIG. 6, the series-coupled resistor (resistor $R_{S2}$), switch (switch $SW_1$) and capacitor (capacitor $C_{S2}$) of circuit 500 (FIG. 6a) are modeled by replacing switch $SW_1$ with resistance (e.g., $R_{SW\_ON}$), capacitance (e.g., $C_{SW1}$, $C_{SW2}$), and parasitic capacitance (e.g., $C_{PAR}$) that are introduced by the switch in FIG. 6b. In an equivalent circuit (FIG. 6c), capacitances $C_{SW2}$ and $C_{PAR}$ are replaced with an equivalent capacitance, $C_2$, with small deltas on the capacitor $C_s$ (e.g., $C_s + \Delta$). In at least one embodiment of circuit 400, since capacitance $C_S$ is between AC and DC grounds, it has a negligible impact and the value of $\Delta$ is not critical. The resistance, $R_{SW\_ON}$ can be considered as one part of resistor $R_S$ and accounted for when determining a resistance of resistor $R_S$. However, capacitance $C_{SW1}$ must also be accounted for when designing circuit 400. If the time constant of $R_{SW\_ON} \times C_{SW1}$ is small enough or the frequency of $1/(R_{SW\_ON} \times C_{SW1})/2/\text{pi}$ is much higher than the frequency of interest (i.e., frequency corresponding to a target data rate), $C_{SW1}$ has negligible impact on circuit 400 or circuit 500. Thus, the ratio between $R_{SW\_ON}/R_S$, which is related to the value of capacitance $C_{SW1}$, should be chosen so that the impact of capacitance $C_{SW1}$ is acceptable. In an ideal circuit 400 or circuit 500, only resistor $R_S$ and capacitor $C_S$ are present and the branch has a time constant of $R_S \times C_S$, which corresponds to the zero frequency of the passive filter. For example, in an embodiment of circuit 400 where $1/(R_{SW\_ON} \times C_{SW1})/2/\text{pi}$ is greater than 16 GHz, then the parasitic capacitor has the following specifications:

for $R_{SW\_ON}$=50Ω, Csw1<200 fF;
for $R_{SW\_ON}$=100, Csw1<100 fF;
for $R_{SW\_ON}$=200, Csw1<50 fF.

Figure 7:
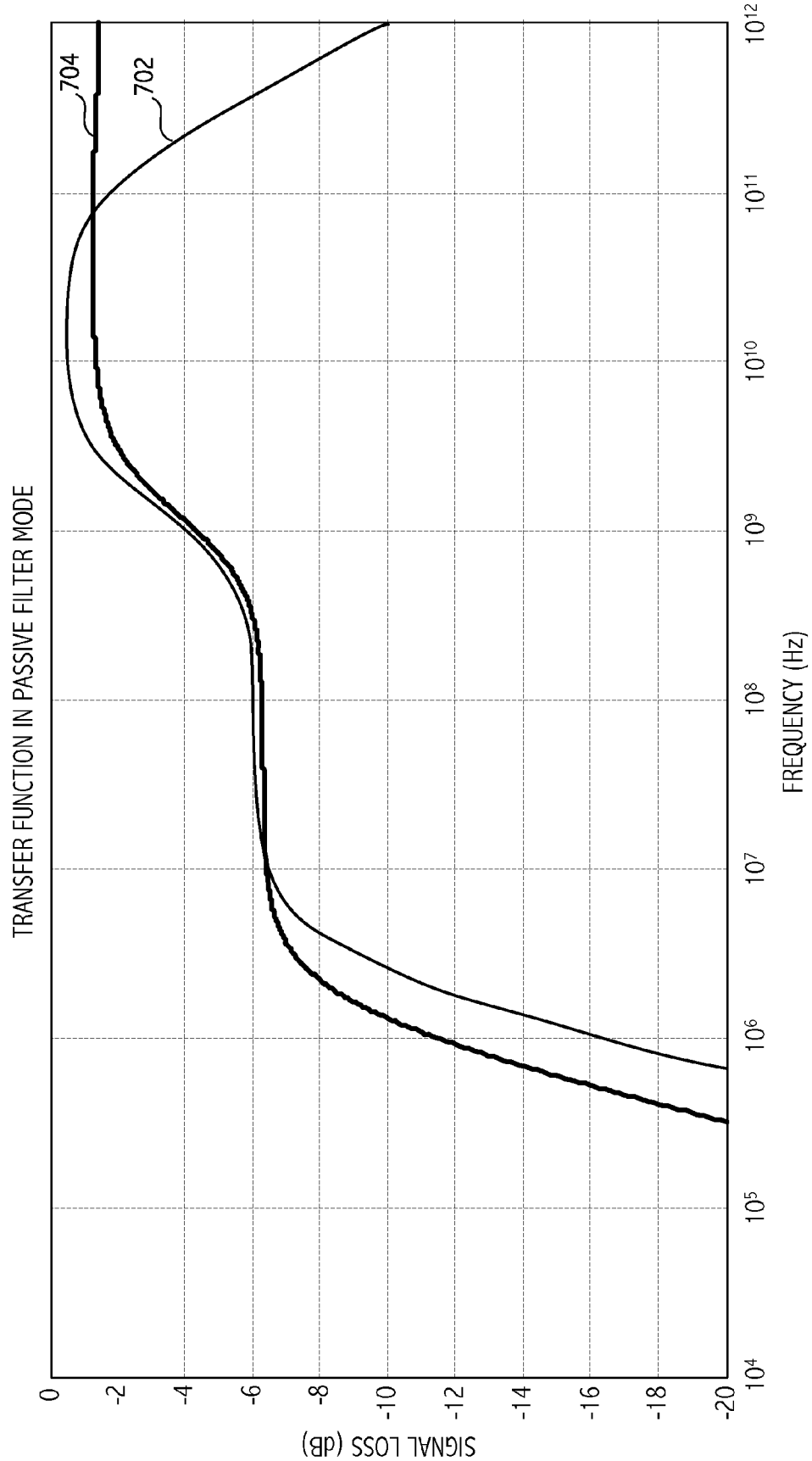
FIG. 7 illustrates an exemplary transfer function of the passive filter and AC coupler circuit of FIG. 4 in a passive filter mode.
Figure 8:
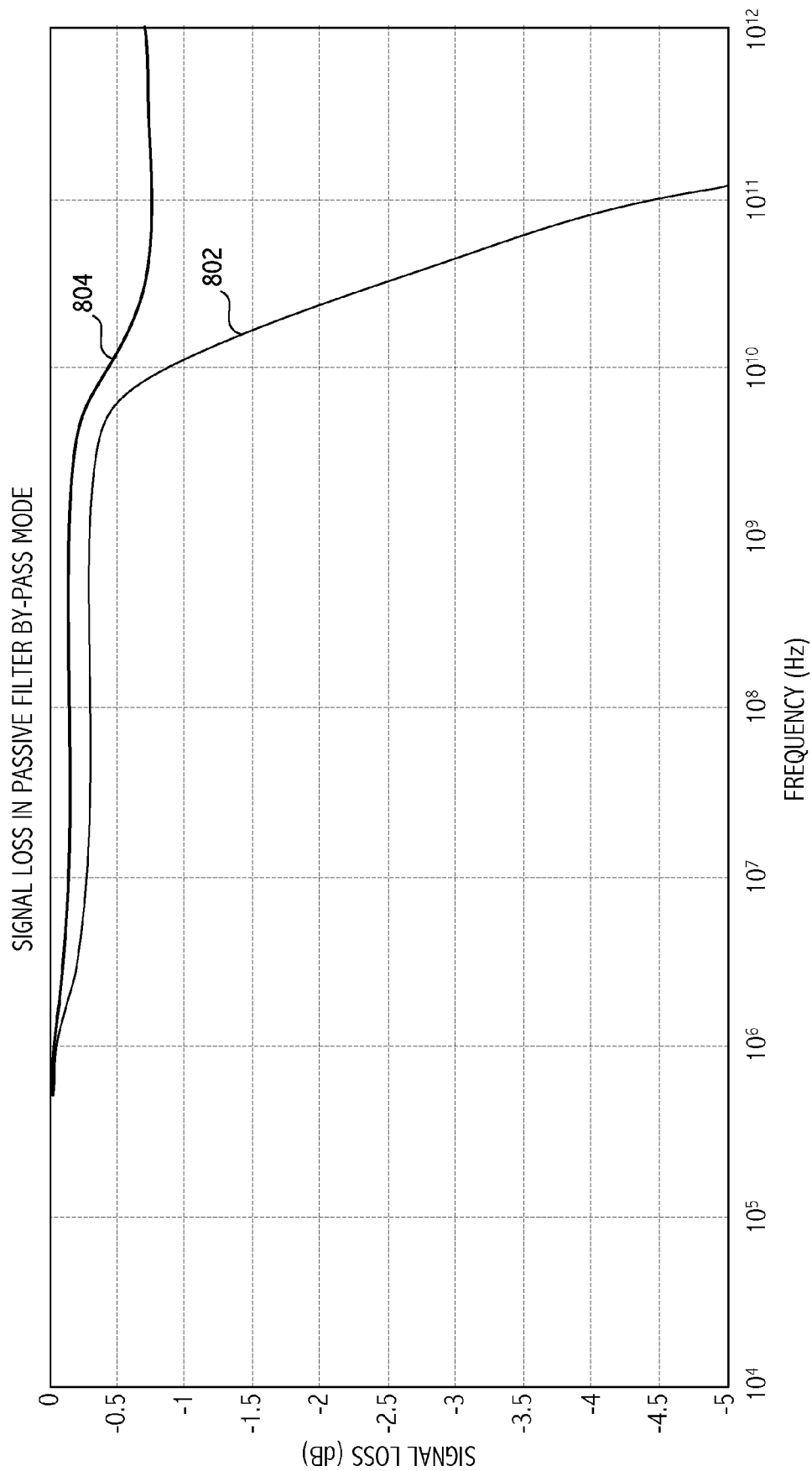
FIG. 8 illustrates an exemplary transfer function of the passive filter and AC coupler circuit of FIG. 4 in a passive filter bypass mode.

Referring to FIG. 7, transfer functions 702 and 704 are illustrated for a passive filter mode of exemplary circuits 200 and 400, respectively. The signal loss is the ratio between the actual transfer function with the passive filter enabled, divided by the ideal transfer function of an AC coupling network. Note that circuit 400 does not have the high-frequency roll-off of circuit 200 because circuit 400 does not have the capacitance of the switches in the main signal path as in circuit 200. Transfer functions 802 and 804 for passive filter bypass mode of circuits 200 and 400, respectively, are illustrated for passive filter bypass mode in FIG. 8. Note that circuit 400 has much smaller high-frequency signal loss as compared to circuit 200.

Figure 9:
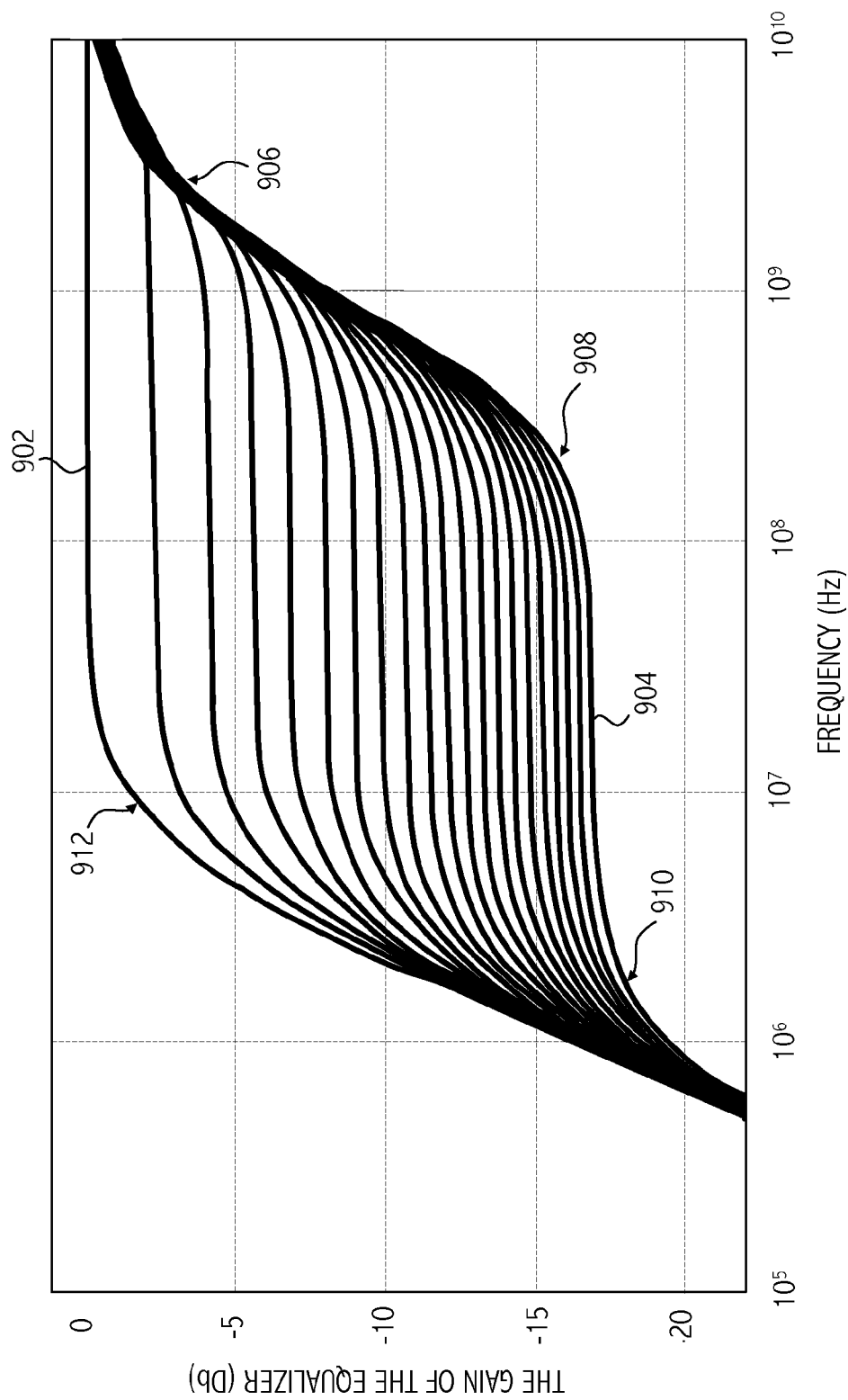
FIG. 9 illustrates an exemplary transfer function of the passive filter and AC coupler circuit of FIG. 5 in various configurations of a passive filter mode.

Referring to FIG. 5 and FIG. 9, in at least one embodiment of circuit 500, $R_S$ is fixed. As the capacitance of capacitor $C_S$ is increased, the AC-coupling corner frequency of the transfer function of circuit 500 moves towards DC. For example, transfer function 904 corresponds to a configuration of circuit 500 having a larger $C_S$ than a configuration of circuit 500 corresponding to transfer function 902. AC-coupling corner frequency 912 of transfer function 902 moves to AC-coupling corner frequency 910 of transfer function 904 with an increase in capacitance of capacitor $C_S$. In addition, the low-frequency gain decreases with increases in $C_S$. However, note that pole location 906 is substantially constant with changes in $C_S$.

In at least one embodiment, the passive filter has lower low-frequency gain for channels with higher loss at high frequencies or has an increased equalization strength (i.e., the difference between the high-frequency gain and the low-frequency gain). In at least one embodiment of the passive filter, the tuning step size is smaller for higher equalization strength. Note that the low-frequency gain is independent of process, voltage, and temperature because it is based only on the ratio of $C_{AC}$ and $C_S$. However, the frequencies of the zero and pole may vary in response to variations in process, voltage, and temperature because they are related to the product of resistance $R_S$ and capacitance (e.g., $C_S$ or $C_{AC}$).

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., HDL, Verilog, GDSII data) of such circuits, systems, and methods, all as described herein, and as defined in the appended claims. In addition the computer readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which differential signals and circuits are used, one of skill in the art will appreciate that the teachings herein can be utilized with single-ended signals and circuits. Variations and modifications of the embodiments disclosed herein, may be made based on the description set forth herein, without departing from the scope and spirit of the invention as set forth in the following claims.

What is claimed is:

1. An apparatus comprising:
    a capacitor coupled between a first node responsive to receive an input signal and a second node; and
    a first circuit coupled to the second node and a third node, the first circuit being selectively operable to configure at least one of a low-frequency gain of an equalizer and a pole of the equalizer, the equalizer comprising the first circuit and the capacitor, the second node being responsive to receive an equalized version of an AC signal of the input signal in a first mode of the apparatus and responsive to receive a non-equalized version of the AC signal of the input signal in a second mode of the apparatus.

2. The apparatus, as recited in claim 1, wherein the first circuit is selectively operable to separately configure the low-frequency gain of the equalizer and the pole of the equalizer.

3. The apparatus, as recited in claim 1, wherein in the second mode of the apparatus the equalizer is disabled.

4. The apparatus, as recited in claim 1, further comprising:
    a second circuit coupled to the second node and a fourth node, the fourth node responsive to receive a bias voltage,
    wherein the equalized version of the AC signal of the input signal is a level-shifted and equalized version of the AC signal of the input signal in the first mode of the apparatus, and
    wherein the non-equalized version of the AC signal of the input signal is a level-shifted version of the AC signal of the input signal in the second mode of the apparatus.

5. The apparatus, as recited in claim 1, wherein the equalizer further comprises:
    at least one resistor selectively coupled to the second node; and
    at least one capacitor selectively coupled to the at least one resistor and the third node.

6. The apparatus, as recited in claim 5, wherein a pole of the equalizer is at least partially based on a resistance of the at least one resistor.

7. The apparatus, as recited in claim 5, wherein a zero of the equalizer is based on the at least one resistor and the at least one capacitor.

8. The apparatus, as recited in claim 5, wherein a low-frequency gain of the equalizer is based on a capacitance of the at least one capacitor.

9. The apparatus, as recited in claim 5, wherein the at least one resistor comprises a plurality of resistors selectively coupled in parallel to the second node.

10. The apparatus, as recited in claim 5, wherein the at least one capacitor comprises a plurality of capacitors selectively coupled in parallel to the at least one resistor.

11. The apparatus, as recited in claim 5, wherein a transfer function of the equalizer is approximately:

$$H_{eq}(S) = \frac{s + \frac{1}{R_S C_S}}{s + \frac{C_S + C_{AC}}{C_S C_{AC} R_S}},$$

where $R_S$ is a resistance of the at least one resistor, $C_S$ is a capacitance of the at least one capacitor, and $C_{AC}$ is a capacitance of the capacitor.

12. A non-transitory computer-readable medium encoding a representation of an integrated circuit that comprises:
    a capacitor coupled between a first node responsive to receive an input signal and a second node; and
    a first circuit coupled to the second node and a third node, the second circuit being selectively operable to configure at least one of a low-frequency gain of an equalizer and a pole of the equalizer, the equalizer comprising the second circuit and the capacitor, the second node being responsive to receive an equalized version of an AC signal of the input signal in a first mode of the integrated circuit and responsive to receive a non-equalized version of the AC signal of the input signal in a second mode of the integrated circuit.

13. The non-transitory computer-readable medium, as recited in claim 12, wherein the integrated circuit further comprises:

a second circuit coupled to the second node and a fourth node, the fourth node responsive to receive a bias voltage, wherein the equalized version of the AC signal of the input signal is a level-shifted and equalized version of the AC signal of the input signal in the first mode of the integrated circuit, and wherein the non-equalized version of the AC signal of the input signal is a level-shifted version of the AC signal of the input signal in the second mode of the integrated circuit.

14. The non-transitory computer-readable medium, as recited in claim 12, wherein the first circuit is selectively operable to separately configure the low-frequency gain of the equalizer and the pole of the equalizer.

15. The non-transitory computer-readable medium, as recited in claim 14, wherein in the second mode of the integrated circuit the equalizer is disabled.

16. The non-transitory computer-readable medium, as recited in claim 12, wherein the equalizer further comprises:
at least one resistor selectively coupled to the second node; and
at least one capacitor selectively coupled to the at least one resistor and the third node.

17. The non-transitory computer-readable medium, as recited in claim 16, wherein a transfer function of the equalizer is approximately:

$$H_{eq}(S) = \frac{s + \frac{1}{R_S C_S}}{s + \frac{C_S + C_{AC}}{C_S C_{AC} R_S}},$$

where $R_S$ is a resistance of the at least one resistor, $C_S$ is a capacitance of the at least one capacitor, and $C_{AC}$ is a capacitance of the capacitor.

18. A method comprising:
receiving a received signal on a first node of a receiver interface; and
capacitively coupling the first node to a second node of the receiver interface, the second node receiving an equalized version of an AC portion of the received signal in a first mode of the receiver interface, the second node receiving a non-equalized version of the AC portion of the received signal in a second mode of the receiver interface.

19. The method, as recited in claim 18, further comprising:
wherein in the first mode of the receiver interface, the equalized version of the AC portion of the received signal of the receiver interface is level-shifted to have a first DC voltage portion, and
wherein in the second mode of the receiver interface, the non-equalized version of the AC portion of the received signal is level-shifted to have the first DC voltage portion.

20. The method, as recited in claim 18, further comprising:
setting a low-frequency gain of an equalizer in response to one or more first control signals; and
setting a pole of the equalizer in response to one or more second control signals, the one or more second control signals being different from the one or more first control signals.

21. The method, as recited in claim 20, wherein a transfer function of the equalizer is approximately:

$$H_{eq}(S) = \frac{s + \frac{1}{R_S C_S}}{s + \frac{C_S + C_{AC}}{C_S C_{AC} R_S}},$$

where $R_S$ is a resistance of at least one resistor, $C_S$ is a capacitance of at least one capacitor in series with the at least one resistor, and $C_{AC}$ is a capacitance of the capacitively coupling.

22. The method, as recited in claim 18, wherein in the first mode of the receiver interface, the method further comprises passively equalizing the received signal, the passively equalizing using the capacitively coupling.

23. The method, as recited in claim 22, wherein the passively equalizing is performed by a passive circuit portion including a capacitor that capacitively couples the first node to the second node.

24. The method, as recited in claim 22, wherein in the first mode of the receiver interface, the method further comprises:
selecting a low-frequency gain of the passively equalizing; and
selecting a pole of the passively equalizing independently from selection of the gain.

* * * * *